April 20, 1954 R. G. LE TOURNEAU 2,675,711
DRIVE PULLEY ASSEMBLY
Filed May 5, 1952 2 Sheets-Sheet 2

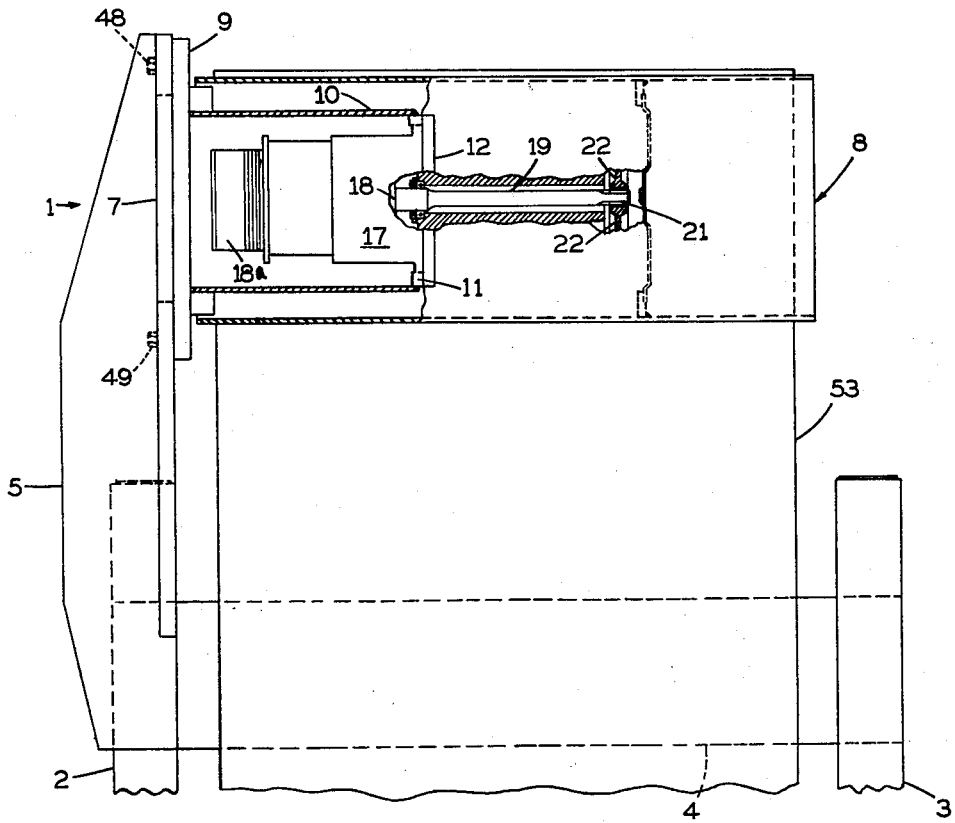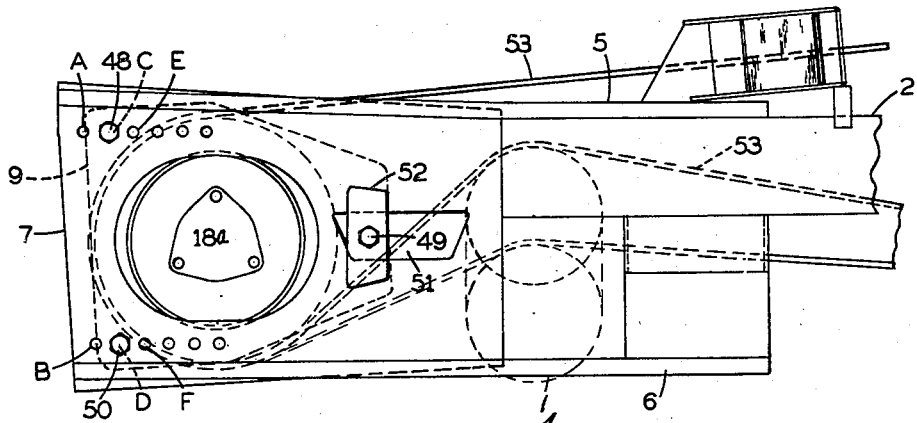

INVENTOR.
ROBERT G. LE TOURNEAU
BY
Lyon & Lyon
ATTORNEYS

Patented Apr. 20, 1954

2,675,711

UNITED STATES PATENT OFFICE 2,675,711

DRIVE PULLEY ASSEMBLY

Robert G. Le Tourneau, Longview, Tex.

Application May 5, 1952, Serial No. 286,140

6 Claims. (Cl. 74—421)

This invention relates generally to power transmitting pulleys, and more particularly to the mounting of drive pulley assemblies and driving mechanisms therefor. Drive pulleys made in accordance with my invention may be used for driving conveyor belts and rotary rooters, e. g., as well as for other uses in which the driven assembly is relatively light or heavy.

One object of my invention is to provide a drive pulley assembly for driving conveyor belts and the like having the driving mechanism mounted wholly within the pulley.

Another object of my invention is to provide such a drive pulley assembly supported at one end only to promote ease of mounting and dismounting.

Another object is to provide a drive pulley assembly for driving a conveyor belt in which the belt may be mounted and removed without disturbing the drive mechanism.

Another object is to provide a drive pulley assembly having its drive mechanism mounted wholly within the pulley to help prevent the accumulation of dirt and grit in the drive mechanism.

Another object is to provide a drive pulley assembly for a conveyor belt supported at one end only and having a novel and practical belt adjusting arrangement.

These and other objects and advantages of the present invention will be apparent from the annexed specification in which:

Figure 1 is a top view, partly in section, of the drive pulley assembly with its mounting frame and conveyor belt shown in part.

Figure 2 is an end view of the structure in Figure 1.

Figure 3:
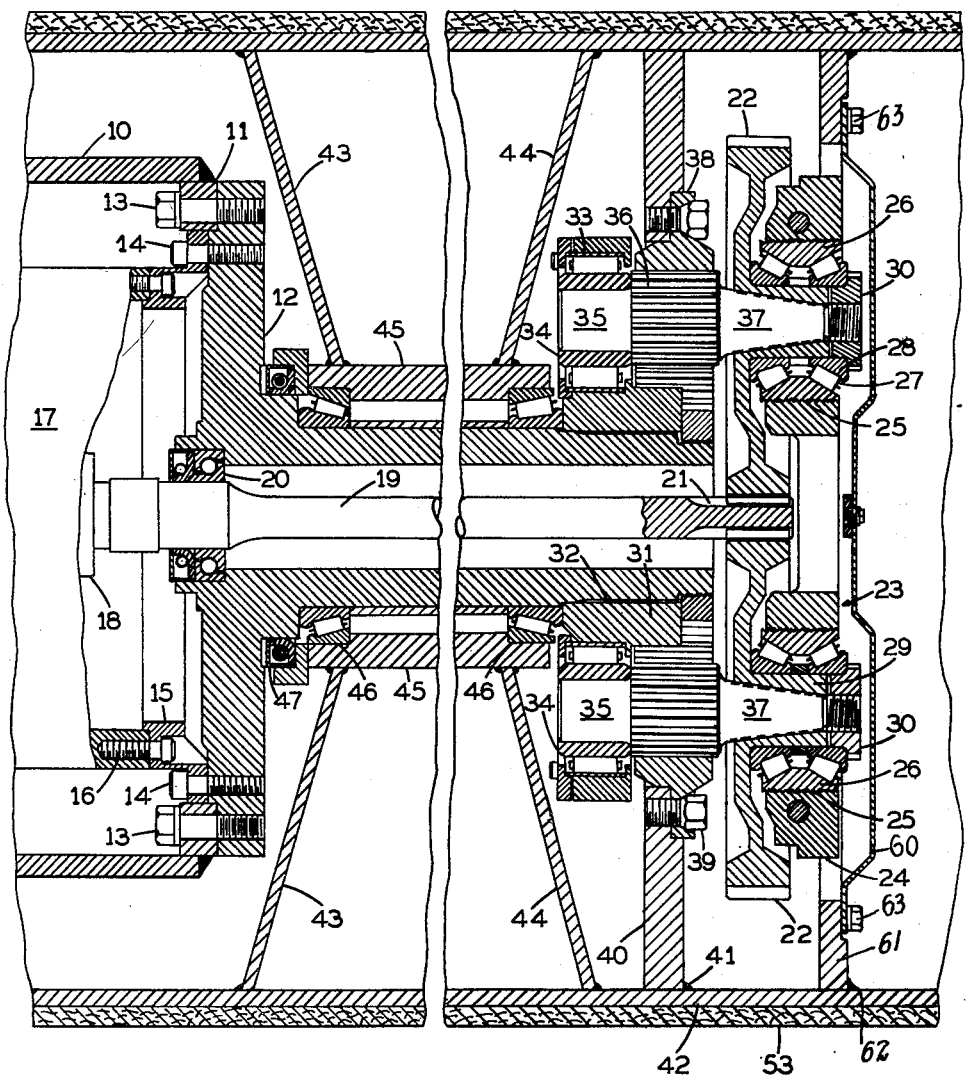
Figure 3 is a fragmentary sectional view of the pulley drive mechanism.

Referring more particularly to the drawings, reference numeral 1 represents a unitary welded elevator frame structure comprising arms 2 and 3, a cross piece 4, reinforcing plates 5 and 6, and a mounting plate 7.

Reference numeral 8 designates a preferred embodiment of the drive pulley assembly of my invention. This assembly comprises a bolt plate 9 rigidly attached to a cylindrical housing 10. The housing 10 is welded to an annular ring 11, which is bolted to a hub 12 by bolts 13. Bolts 14 removably connect a ring 15 to hub 12, and bolts 16 connect the ring 15 to a housing 17 for a motor 18 and brake assembly 18a.

The power means for driving the pulley of my invention comprises the motor 18 and a gearing system hereinafter described. The motor 18 drives a relatively long shaft 19 which is supported by a bearing at one end only. This bearing 20 is provided between the hub 12 and the shaft 19, and the outer end of the shaft 19 carries a pinion 21. The pinion 21 meshes with gears 22, which gears are mounted in a spider 23 of novel construction. This spider includes a front plate 24 which is provided with a plurality of openings, shown here as two in number, 25 which are threaded to receive the tapered rings 26 which serve as retainers for tapered roller bearings 27 seated on bearing races 28, which races are in turn seated upon the hub 29 of the gears 22 and upon the retaining nut 30. The spider 23 includes a back plate 31, which plate is connected to the plate 24 by spacers (not shown). The plate 31 is keyed to the hub 12 as at 32 and is provided with a plurality of openings, two in number, 33 in which are seated bearings 34 shown here in the form of roller bearings supporting a countershaft 35. Countershaft 35 has a pinion 36 formed thereon and has a tapered portion 37 upon which is fixedly mounted the tapered interior of the hub 29 of the gears 22. The pinions 36 mesh with a ring gear 38, which ring gear is affixed by bolts 39 to an inwardly standing ring 40 welded as at 41 to the drive pulley 42. The pulley 42 may also be provided with a pair of inwardly extending plates 43 and 44 welded to the interior of the pulley, as shown, and having a central opening welded to a cylinder 45, which cylinder may engage races 46 of roller bearings engaging the hub 12. A sealing ring 47 is also provided between the cylinder 45 and the hub 12, as shown.

From the foregoing description it will be seen that the pulley 42 is entirely supported by support means comprising bolt plate 9 of housing 10 and hub 12, which bolt plate is adjustably secured on mounting plate 7 by bolts 48, 49 and 50.

This adjustable feature may be best seen in Figures 1 and 2 in which the mounting plate 7 may be seen with bolt holes A, B, C, D, E, F etc. Bolts 48 and 50 may be inserted in the holes C and D and in tapped holes of bolt plate 9. Mounting plate 7 has a slot 51 therein to allow bolt 49 to engage another tapped hole in bolt plate 9 and bring clamp plate 52 into firm engagement with mounting plate 7. In order to tighten the conveyor belt 53, bolts 49 and 50 may be loosened, and bolt 48 moved to hole A. Further tightening may be accomplished by moving bolt 50 to hole B. Similarly to loosen the belt 53, bolt 48 may be moved to hole E and further loosening may be accomplished by moving bolt 50 to hole F etc. It may be seen that slot 51 permits adjusting movement of bolt 49 when the bolt is loosened. This "walking action" adjustment is possible since bolt holes A, C, E etc. are staggered with respect to holes B, D, F etc.

A closure plate 60 is provided adapted to be removably affixed to a ring 61 welded to the interior of the pulley 42 as at 62 and secured to said ring by a series of bolts 63. It will thus be seen that the entire mechanism for driving the pulley 42 is mounted within the confines of the pulley 42 and protected by the pulley and the closure plate 60 from dirt and grit.

While there has been described what is at present considered a preferred embodiment of the present invention, it will be appreciated by those skilled in the art that various changes and modifications can be made therein without departing from the essence of the invention, and it is intended to cover herein all such changes and modifications as come within the true spirit and scope of the appended claims.

What is claimed is:

1. A drive pulley assembly comprising: support means; a pulley mounted for rotation about the support means; said support means comprising a housing having a bolt plate rigidly attached thereto, an annular ring fixed to the housing, a hub detachably secured to the ring, said pulley being rotatably mounted on the hub, and power means for rotating the pulley, said power means being contained wholly within the pulley.

2. A drive pulley assembly as set forth in claim 1 having a mounting plate for adjustably supporting said pulley assembly at one end only.

3. A drive pulley assembly comprising: support means comprising a housing having a bolt plate rigidly attached thereto, an annular ring fixed to the housing and a hub detachably secured to the ring; a hollow cylindrical pulley mounted for rotation about the hub; a mounting plate for adjustably supporting the bolt plate and thereby supporting the pulley from one end only, said mounting plate being characterized by having upper and lower rows of holes and a slot formed therein; said bolt plate having holes formed therein adapted for cooperation with the mounting plate holes and said slot; and adjustable clamp means for securing the bolt plate to the mounting plate.

4. A drive pulley assembly comprising: support means comprising a housing having a mounting plate rigidly attached thereto; means detachably mounting a hub on said housing; a motor in said housing; a shaft driven by said motor; said hub having a centrally disposed bore; said shaft extending through said bore; a pulley in the form of a hollow cylinder rotatably mounted on said hub; a drive pinion on said shaft; a gear train between said pinion and said pulley; said pulley having its cylindrical wall extended to enclose said motor, shaft, hub and gear train.

5. A drive pulley assembly comprising: support means comprising a housing having a mounting plate rigidly attached thereto; means detachably mounting a hub on said housing; a motor in said housing; a shaft driven by said motor; said hub having a centrally disposed bore; said shaft extending through said bore; a pulley in the form of a hollow cylinder rotatably mounted on said hub; a drive pinion on said shaft; a gear train between said pinion and said pulley; said pulley having its cylindrical wall extended to enclose said motor, shaft, hub and gear train; said pulley assembly being supported solely from one end by the connection of said housing to said mounting plate.

6. A drive pulley assembly comprising: support means comprising a housing having a mounting plate rigidly attached thereto; means detachably mounting a hub on said housing; a motor in said housing; a shaft driven by said motor; said hub having a centrally disposed bore; said shaft extending through said bore; a pulley in the form of a hollow cylinder rotatably mounted on said hub; a drive pinion on said shaft; a gear train between said pinion and said pulley; said pulley having its cylindrical wall extended to enclose said motor, shaft, hub and gear train; said pulley assembly being supported solely from one end by the connection of said housing to said mounting plate; and removable closure means for the free end of said pulley.

References Cited in the file of this patent

FOREIGN PATENTS

| Number | Country | Date |
|---|---|---|
| 467,151 | Great Britain | June 11, 1937 |
| 542,324 | Germany | Jan. 22, 1932 |
| 270,264 | Great Britain | Sept. 1, 1927 |